Figure 1:
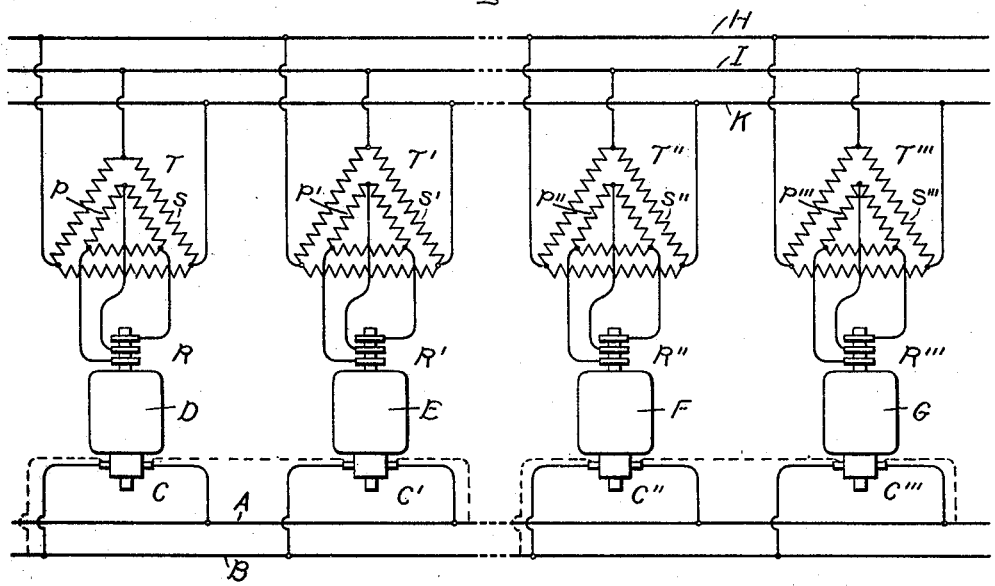

No. 755,814. PATENTED MAR. 29, 1904.
D. P. THOMSON.
COUPLING ELECTRIC MOTORS.
APPLICATION FILED SEPT. 8, 1903.
NO MODEL. 2 SHEETS—SHEET 1.

Witnesses.
George H. Tilden
Helen Orford

Inventor.
David P. Thomson.
by Albert H. Graham
Att'y.

No. 755,814. PATENTED MAR. 29, 1904.
D. P. THOMSON.
COUPLING ELECTRIC MOTORS.
APPLICATION FILED SEPT. 8, 1903.
NO MODEL. 2 SHEETS—SHEET 2.

Witnesses:
George W. Tilden.
Helen Orford

Inventor:
David P. Thomson,
by Albert G. Davis
Atty.

No. 755,814. Patented March 29, 1904.

UNITED STATES PATENT OFFICE.

DAVID P. THOMSON, OF RUGBY, ENGLAND, ASSIGNOR TO GENERAL ELECTRIC COMPANY, A CORPORATION OF NEW YORK.

COUPLING ELECTRIC MOTORS.

SPECIFICATION forming part of Letters Patent No. 755,814, dated March 29, 1904.

Application filed September 8, 1903. Serial No. 172,200. (No model.)

*To all whom it may concern:*

Be it known that I, DAVID P. THOMSON, a citizen of the United States, residing at Rugby, England, have invented certain new and useful Improvements in Coupling Electric Motors, of which the following is a specification.

My present invention relates to means for compelling dynamo-electric machines to run in unison, and has for its object the provision of improved means for synchronizing the rotation of armatures in such apparatus which will be effective irrespective of the character of the connections between the said machines and the supply system to which they are connected.

It has been proposed to maintain the armatures of direct-current machines in synchronous rotation by connecting collector-rings to corresponding fixed points in the armature-windings and joining the collector-rings by direct equalizing connections. It is well understood in the art, however, that such connections cannot be employed to synchronize machines when the armature-windings are connected in series, and they are therefore excluded from use in many cases where it is desirable to compel the synchronous operation of a plurality of machines, among which cases is that of railway-motors controlled according to the well-known series-parallel system. In order to provide means for synchronizing machines under the circumstances described, it has been proposed to do away with the metallic connections between the commutators of machines to be synchronized and the synchronizing connections by placing separate power and equalizing windings upon the armatures of the machines, the power-windings being provided with commutators adapted to be connected to the source of supply and the equalizing-windings being connected together by means of collector-rings and suitable circuit connections. The function of the equalizing-windings is to generate or receive equalizing-currents whenever the machines are not in synchronism. The power and equalizing windings may be placed upon the same or different cores and in the same or different magnetic fields. This construction is, however, expensive and complicated, and it is my aim to provide a cheaper and less complicated arrangement which can readily be applied to standard types of machines. I accomplish this result by connecting corresponding fixed points in the armature-windings of the machines to be synchronized by equalizing connections of such a character that only equalizing-current will flow through them.

I have chosen to illustrate my invention in connection with direct-current motors; but I do not wish to be understood as limiting it to them, for it may be applied to direct-current dynamo-electric machines, whether they be generators or motors, and other embodiments and applications may be made without departing from my invention. Therefore I do not wish to be limited to the particular embodiment of my invention shown in the accompanying drawings.

Figure 2:
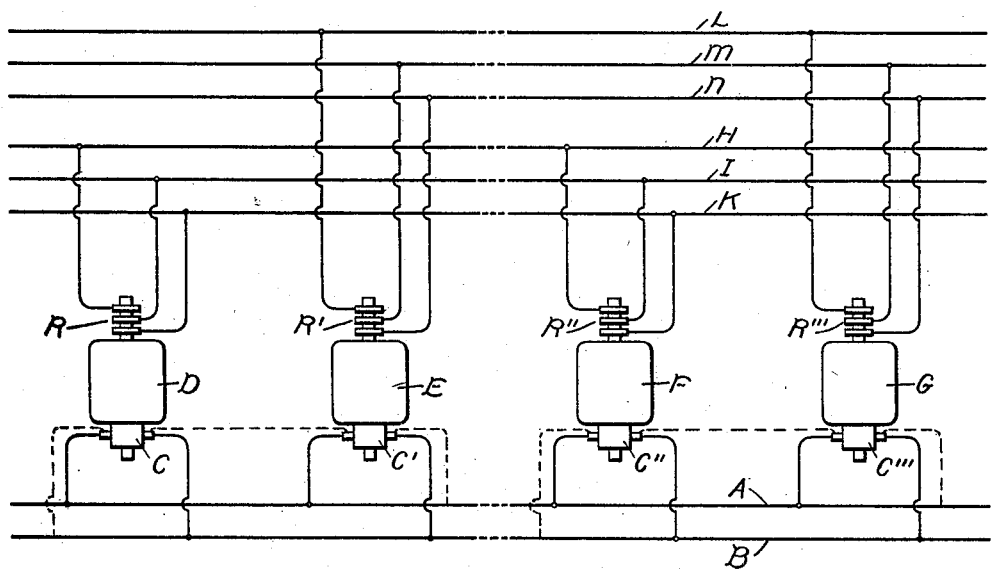
Figure 3:
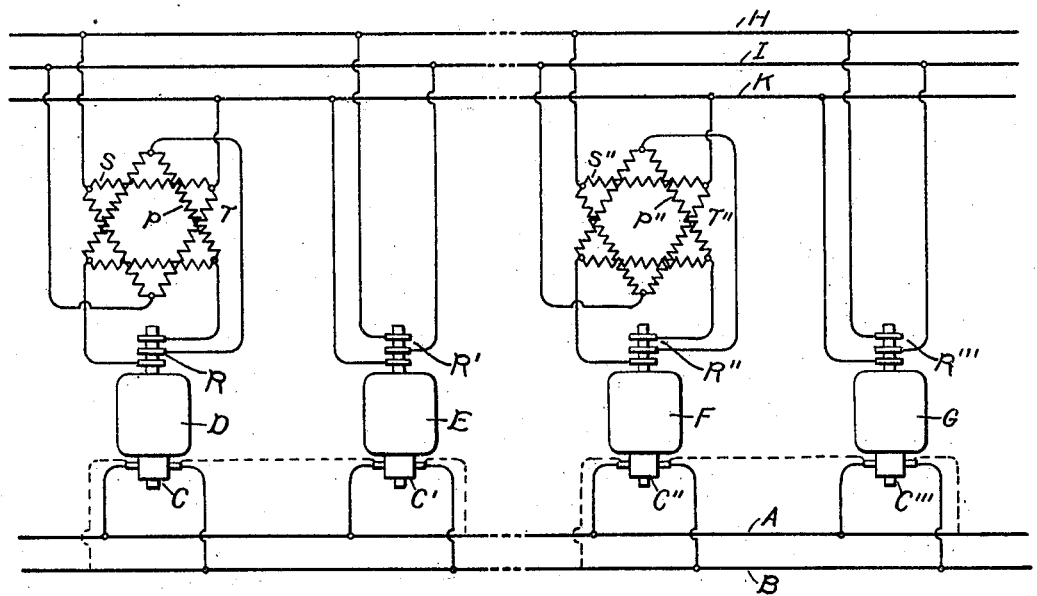
Figure 4:
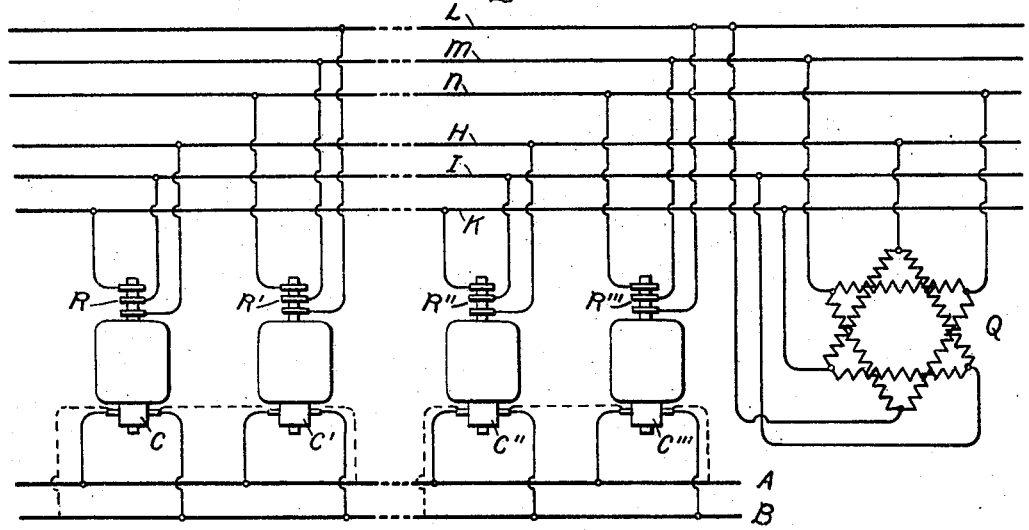

Referring to the drawings, in which like parts are designated by like letters, Figure 1 is a diagram illustrating two groups of motors, which may be considered to represent the equipment of two railway-cars or other apparatus which it is desired to operate. Each motor is provided with collector-rings and with a commutator. The commutator-brushes are connected across the supply-mains, and the collector-rings are inductively connected, by means of transformers, to the equalizing-conductors. Fig. 2 is a diagram representing a similar equipment except that two sets of equalizing-conductors are provided and similar motors are directly connected to the same set of equalizing-conductors, the transformers or other inductive connections being dispensed with in this instance. Fig. 3 is a diagram showing inductive connections differing from those shown in Fig. 1 in that the inductive connections of one set of similar motors is dispensed with, that set being joined to the equalizing-conductors by direct connections, the remaining motors being inductively connected to the equalizing-conductors, as in Fig. 1. Fig. 4 differs from Fig. 2 in that the two sets of equalizing-conductors are inductively connected together. The motor-fields have been omitted in all the figures, since their application is well understood.

Referring to Fig. 1 in detail, A and B are direct-current-supply mains connected to any suitable source of supply. D and E represent the armatures of the motors of one equipment, and F and G the armatures of the motors of a second equipment. To the armature-windings of these motors are joined in the usual manner the commutators C, C', C'', and C''', respectively, and also the collector-rings R, R', R'', and R''', respectively, the collector-rings being connected to the windings in a well-known manner, so that a three-phase electromotive force is obtained. T, T', T'', and T''' are three-phase transformers of any suitable ratio, of which $p$, $p'$, $p''$, and $p'''$ are the primaries, respectively, and $s$, $s'$, $s''$, and $s'''$ their respective secondaries. H, I, and K are continuous equalizing-conductors. The dotted lines in the supply-mains and in the equalizing-conductors indicate that the separate groups or equipments may be located at some distance from each other. Similar collector-rings are connected to similar points in one of the windings of the several transformers, and similar points in the other windings are connected to the same equalizing-conductor. The commutators may be connected in parallel across the supply-mains, as indicated by the full lines, or may be connected in groups, the windings of each group being in series across said supply-mains, as indicated by the dotted lines.

The operation of the apparatus is as follows: When the motors are connected to the supply-mains, as indicated by the full lines, they will when running at the same speed generate equal and opposite electromotive forces at their collector-rings, the result being that this voltage which is transferred to the equalizing-conductors by the transformers will be equal and opposed, and therefore no current will flow. If, however, there is a difference of speed between any two of the motors, a difference of electromotive force will be produced between the collector-rings of those motors, which will cause equalizing-current to flow. This current will tend to bring all the motors to the same speed, when the flow of current will cease. In this instance this result might have been accomplished by joining the collector-rings of the motors to the equalizing-conductors by means of direct connections—that is, without the interposition of the inductive connection furnished by the transformers. If, however, the armatures be connected in series across the supply-mains, as shown by the dotted lines, a useless current and one which would be likely to cause damage would flow between the motors if their collector-rings were joined to the equalizing-conductors by direct connections in the manner described. This is prevented by the interposition of the transformers in the equalizing-circuits, which while permitting the transmission of equalizing-currents between the motors does not provide circuits for the useless current referred to.

Referring to Fig. 2, in addition to equalizing-conductors H, I, and K another set, comprising the conductors L, M, and N, is provided. To one set of said conductors, as H, I, and K, are connected a set of similar motors having armatures D and F, while to the other set of equalizing-conductors are connected another set of similar motors having armatures E and G. It is obvious that proper operation will take place while the motors are individually connected across the supply-mains, as shown by the full lines, and this is equally true when they are connected in series across the supply-mains, as indicated by the dotted lines, since there is no tendency for other than equalizing-current to flow between similar motors of the groups. With this arrangement, however, one half of the motors are equalized among themselves, while the other half are equalized among themselves, the result being that it is possible that one half the motors may operate at one speed while the other half may operate at another speed. It is not probable, however, that this would prove a difficulty in practice, since where the motors are connected to a common load, as upon a railway car or train, this is not liable to occur. In order, however, to avoid the possibility of this occurrence, the sets of equalizing-conductors may be inductively connected together by a transformer Q, as illustrated in Fig. 4, in which the motors are connected in the same relation to the equalizing-conductors as in Fig. 2. Since it is necessary that the electromotive forces impressed upon these conductors by the armatures shall be normally equal and opposed to each other, it is necessary that the connections to the different windings of the transformer Q be removed from each other by one hundred and eighty degrees, as shown. This, however, could be accomplished by changing the relations of the motor-windings to the equalizing-conductors, the only requirement to be fulfilled being that the electromotive forces impressed upon the equalizing-conductors by the armature-windings shall be equal and opposed to each other when the armatures are in synchronism. With the connection as shown in Fig. 4 the equalizing action takes place between all of the motors. When the motor-armatures are connected to the supply-mains, as indicated by the full lines, there is no tendency for other than equalizing-current to flow, and when the armatures are connected in series across the supply-mains, as indicated by the dotted lines, no other current tends to flow between similar motors in the different groups, and as the direct circuit between dissimilar motors, through which detrimental current might flow, is broken by the inductive connections between the two sets of equalizing conductors such current is entirely prevented.

While the equipment of Fig. 1 fulfils its purpose, so far as the operation of the motors is concerned, it requires that a transformer be supplied for each motor. In order to reduce the expense of the equipment, the arrangement shown in Fig. 3 may be adopted, in which one of the sets of similar motor-armatures, as E and G, have their collector-rings joined to the equalizer-conductors by direct connections, the other set of similar motors being inductively connected to said equalizer-conductors by transformers, as T and T''. For reasons already stated the connections to the primaries and secondaries of the motors should in this case be displaced by one hundred and eighty degrees with relation to each other. Equalizing action will now take place between all the motors, while for reasons already explained no detrimental current can flow, and the number of transformers required is one-half that which would be necessary with the arrangement shown in Fig. 1.

While I have shown three-phase equalizing connections, it will be apparent to those skilled in the art that any other suitable number of phases may be employed.

What I claim as new, and desire to secure by Letters Patent of the United States, is—

1. The combination with supply-mains, of a plurality of dynamo-electric machines, each of said machines having a winding connected both to a commutator and to collector-rings and the said windings being arranged in groups with the windings of each group connected in series across said supply-mains, and equalizing-conductors connected to said collector-rings in such manner that they form paths for equalizing-currents only.

2. The combination with supply-mains, of a plurality of dynamo-electric machines, each of said machines having a winding connected both to a commutator and to collector-rings and the said windings being adapted to be connected through their commutators across said supply-mains either individually or in series groups, and equalizing-conductors connected to said collector-rings in such manner that they form paths for equalizing-currents only, whether said windings are connected individually or in series groups.

3. The combination with supply-mains, of a plurality of dynamo-electric machines, each of said machines having windings connected both to a commutator and to collector-rings, connections from said commutators to said mains, and equalizing-conductors inductively connected between said collector-rings.

4. The combination with supply-mains, of a plurality of groups of dynamo-electric machines, each of said machines having a winding connected both to a commutator and to collector-rings and the windings of each group adapted to be connected in series across said supply-mains through their commutators, and equalizing-conductors directly connected to the collector-rings of similar machines in said groups.

5. The combination with supply-mains, of a plurality of groups of dynamo-electric machines, each of said machines having a winding connected both to a commutator and to collector-rings and the windings of each group adapted to be connected in series across said supply-mains through their commutators, and equalizing-conductors directly connected to the collector-rings of one set of similar motors in said groups and inductively connected to another set of similar motors in said groups.

6. The combination with supply-mains, of a plurality of direct-current motors, each of said motors having a winding connected both to a commutator and to collector-rings, connections between said commutators and said supply-mains, and equalizing-conductors inductively connected between said collector-rings.

7. The combination with supply-mains, of a plurality of groups of dynamo-electric machines, each of said machines having a winding connected both to a commutator and to collector-rings, a transformer or transformers, and equalizing-conductors connected to the collector-rings of the several dynamo-electric machines and to the transformer-windings in such manner that the windings of the several machines in each single group will be inductively connected through the equalizing connections.

8. The combination with a number of groups of dynamo-electric machines, each machine having a winding connected to a commutator and the said windings being adapted to be connected in series or in parallel, of equalizing-conductors directly connected to corresponding fixed points in the windings of similar machines in the several groups.

9. The combination with a plurality of dynamo-electric machines, of equalizing-conductors connected to corresponding fixed points in the windings of said machines, and an inductive connection between said equalizing-conductors.

10. The combination with a plurality of dynamo-electric machines, of a transformer, and equalizing-conductors connecting corresponding fixed points in the windings of the said machines through the windings of the said transformer.

11. The combination with a plurality of dynamo-electric machines, of a transformer having a plurality of windings, and equalizing-conductors connecting each of the said transformer-windings to fixed points in the windings of one of said dynamo-electric machines.

In witness whereof I have hereunto set my hand this 24th day of August, 1903.

DAVID P. THOMSON.

Witnesses:
 E. M. WEBB,
 F. E. MAHER.